3,573,962
METHOD FOR THE DRY LUBRICATION OF MECHANICAL COMPONENTS
Bernard Blampin, Chilly-Mazarin, France, assignor to Electricite de France (Service National), Paris, France
No Drawing. Filed Oct. 24, 1968, Ser. No. 770,421
Claims priority, application France, Nov. 22, 1967, 129,190
Int. Cl. F16c *33/04, 33/16*
U.S. Cl. 117—49
5 Claims

ABSTRACT OF THE DISCLOSURE

A method for the dry lubrication of mechanical components in the hot state and in a gaseous atmosphere when friction forces are established between said components. The method consists in the successive steps of depositing an adherent coating of calcium fluoride on the friction surface of one of the components considered, in depositing a hardness-increasing coating made up of a similarly adherent substance on the friction surface of the component which is intended to cooperate with the first and in then applying graphite to at least one of said two friction surfaces.

---

This invention is directed to a method for carrying out under satisfactory conditions the dry lubrication of mechanical components which are required to apply friction forces to each other and which are heated during operation in a gaseous atmosphere to temperatures which can vary, for example, between 0 and 500° C.

The problems of friction in a hot gaseous atmosphere are difficult to solve. In point of fact, above 200 to 250° C., no lubricating oil or grease at present known retains its lubricating properties in the course of time. Under such conditions, a hardening of these substances takes place under the action of heat or even oxidation or evaporation.

An approach to the solution of these problems has already been made by resorting to the use of solid lubricants, of which calcium fluoride and graphite are well-known examples. However, in the special applications mentioned above, the separate use of each substance does not produce wholly satisfactory results. In point of fact, it has been found in accordance with the invention that the simultaneous utilization of these substances under predetermined conditions yields results which are greatly superior to those which are achieved when each substance is employed separately.

To this end, the method of lubrication under consideration is characterized in that its consists in depositing an adherent coating of calcium fluoride on the friction surface of one of the components considered, in then depositing a hardness-increasing coating made up of a similarly adherent substance on the friction surface of the component which is intended to cooperate with the first and in finally applying graphite to at least one of said two friction surfaces.

For the practical application of the invention, it is advisable in particular to ensure that the part which is intended to receive the coating of calcium fluoride is constituted at least at the surface thereof by a material having a relatively high degree of hardness such as quench-hardened steel. Calcium fluoride in the powdered state is advantageously deposited on this material by means of a spray-gun in accordance with conventional plasma-spray techniques. Since this process entails preliminary sand-blasting of the surface to be coated, and if the conditions of utilization are sufficiently highly oxidizing, it is usually necessary to subject the part to an annealing treatment after spraying in order to eliminate work-hardening which results from sand-blasting. If this precaution were not taken, the sand-blasted metal would oxidize and result in detachment of the calcium fluoride deposit by reason of the porous nature of this latter. The annealing operation referred-to must be carried out in a neutral or slightly reducing atmosphere, or even under vacuum.

The friction surface of the component which is intended to cooperate with the part referred-to above must have an extremely high degree of hardness in order that it cannot be scored at low temperature by the calcium fluoride. This objective is achieved in a highly satisfactory manner by depositing an alumina coating on said surface, also by the plasma-spray process. In order to ensure that the calcium fluoride which is deposited on the first part is not liable to break away as a result of abrasion during friction, the surface of the alumina must be very highly polished; the roughness of said surface must be lower in value than $0.20\mu$ C.L.A. (Center Line Average). This state of surface can be obtained by grinding with a diamond wheel. Other very hard materials can perform the same function as sprayed alumina on condition that identical or smaller values of surface roughness can be obtained; by way of example, mention can be made of massive alumina, chromized steels, nitrided steels, carbides, stellites, high-speed steels and so forth. The hardness to be obtained must be substantially higher than that of the fluoride.

Finally, graphite is applied on one but preferably both friction surfaces which are coated respectively with calcium fluoride and alumina, this application being carried out by repeated rubbing with a graphite piece.

The assembly which is thus obtained ensures very low friction coefficients even at low speed (of the order of 0.10 at 20° C. and 0.25 at 400° C.). A large number of tests have shown that the range of utilization in respect of temperature, load and speed of parts treated in the manner hereinabove described is considerably wider than in the case of utilization of each constituent applied separately, namely calcium fluoride or graphite. Furthermore, excellent corrosion resistance in a hot oxidizing atmosphere is exhibited by surfaces which are treated in accordance with the invention.

What we claim is:

1. A method for the production of a self-lubricating component assembly having at least a first and a second cooperating surface having a high degree of hardness subject to interacting friction forces between them in the hot state and in a gaseous atmosphere comprising the steps of depositing an adherent coating of calcium fluoride on the first cooperating surface, depositing an adherent coating on the second cooperating surface of a substance which is harder than the material of said second surface and which is of such a nature that it is not scored at low temperature by said calcium fluoride coated surface and applying graphite to at least one of said coated surfaces.

2. A method as described in claim 1 including the step of depositing the calcium fluoride in powdered state by plasma-spray, said first surface being a quench-hardened steel.

3. A method as described in claim 1 including the step of subjecting said first surface to a preliminary sandblast, the component having this surface being subjected to an annealing step after deposition of the calcium fluoride thereon.

4. A method as described in claim 1 including the step of polishing said second coated surface.

5. A method as described in claim 1, the graphite being applied by repeated rubbing with a graphite piece.

References Cited

UNITED STATES PATENTS

| | | | |
|---|---|---|---|
| 3,155,439 | 11/1964 | Guzewicz | 308—241 |
| 3,470,035 | 9/1969 | Maknis | 148—13 |
| 3,481,715 | 12/1969 | Whalen et al. | 117—69X |
| 3,483,019 | 12/1969 | Youse | 117—69 |
| 3,497,376 | 2/1970 | Wieser | 117—69X |

ALFRED L. LEAVITT, Primary Examiner

E. G. WHITBY, Assistant Examiner

U.S. Cl. X.R.

117—64, 69, 93.1, 127; 148—13.1: 308—241